US007990743B2

(12) United States Patent
Walling et al.

(10) Patent No.: US 7,990,743 B2
(45) Date of Patent: Aug. 2, 2011

(54) SYSTEM AND METHOD FOR DECREASING SOLAR COLLECTOR SYSTEM LOSSES

(75) Inventors: Reigh Allen Walling, Clifton Park, NY (US); Mark Edward Cardinal, Altamont, NY (US); Robert William Delmerico, Clifton Park, NY (US); Nicholas Wright Miller, Delmar, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/582,353

(22) Filed: Oct. 20, 2009

(65) Prior Publication Data

US 2010/0138061 A1    Jun. 3, 2010

(51) Int. Cl.
*H02M 7/48* (2007.01)
(52) U.S. Cl. .............. 363/71; 323/906; 323/207
(58) Field of Classification Search .......... 323/906, 323/207; 363/71; 136/293, 244
See application file for complete search history.

(56) References Cited

U.S. PATENT DOCUMENTS

| | | | |
|---|---|---|---|
| 4,404,472 A * | 9/1983 | Steigerwald | 307/46 |
| 4,667,283 A | 5/1987 | Seki et al. | |
| 5,280,228 A | 1/1994 | Kanouda et al. | |
| 5,384,696 A | 1/1995 | Moran et al. | |
| 5,677,833 A * | 10/1997 | Bingley | 363/71 |
| 5,835,353 A | 11/1998 | Dalby | |
| 5,892,675 A | 4/1999 | Yatsu et al. | |
| 6,058,035 A | 5/2000 | Madenokouji et al. | |
| 6,134,124 A | 10/2000 | Jungreis et al. | |
| 6,229,722 B1 | 5/2001 | Ichikawa et al. | |
| 6,285,572 B1 | 9/2001 | Onizuka et al. | |
| 6,291,764 B1 | 9/2001 | Ishida et al. | |
| 6,316,918 B1 | 11/2001 | Underwood et al. | |
| 6,339,538 B1 | 1/2002 | Handleman | |
| 6,369,462 B1 | 4/2002 | Siri | |
| 6,373,731 B1 | 4/2002 | Iwamura et al. | |
| 6,380,719 B2 | 4/2002 | Underwood et al. | |
| 6,411,065 B1 | 6/2002 | Underwood et al. | |
| 6,452,289 B1 | 9/2002 | Lansberry et al. | |
| 6,690,589 B2 | 2/2004 | Barnett et al. | |

(Continued)

FOREIGN PATENT DOCUMENTS

EP    0947904 B1    10/2003

(Continued)

OTHER PUBLICATIONS

English Abstract of EP1463188A2, 2004.

*Primary Examiner* — Shawn Riley
(74) *Attorney, Agent, or Firm* — Dority & Manning, P.A.

(57) ABSTRACT

A solar farm system is provided that is configured for reducing electrical loss. The solar farm system includes a plurality of PV arrays coupled to inverters and a collector system including a conductor or network of conductors. The collector system also includes a plurality of transformers with one or more transformers connected between the inverters and the conductors. The solar farm also includes a substation transformer connecting the solar farm collector system to the electrical grid. The solar farm includes a control system configured to determine at least one operating parameter for the solar farm system to reduce electrical loss and to regulate the collector system and the plurality of inverters based at least in part on the at least one operating parameter.

20 Claims, 7 Drawing Sheets

U.S. PATENT DOCUMENTS

| | | |
|---|---|---|
| 6,693,809 B2 | 2/2004 | Engler |
| 6,750,391 B2 * | 6/2004 | Bower et al. .................. 136/244 |
| 6,765,315 B2 | 7/2004 | Hammerstrom et al. |
| 6,853,940 B2 | 2/2005 | Tuladhar |
| 6,924,565 B2 | 8/2005 | Wilkins et al. |
| 6,940,735 B2 | 9/2005 | Deng et al. |
| 6,963,147 B2 | 11/2005 | Kurokami et al. |
| 6,979,980 B1 | 12/2005 | Hesterman et al. |
| 7,015,597 B2 | 3/2006 | Colby et al. |
| 7,072,194 B2 | 7/2006 | Nayar et al. |
| 7,072,195 B2 * | 7/2006 | Xu ................................. 363/95 |
| 7,099,169 B2 | 8/2006 | West et al. |
| 7,119,452 B2 | 10/2006 | Larsen |
| 7,120,039 B2 | 10/2006 | Burger et al. |
| 7,145,266 B2 | 12/2006 | Lynch et al. |
| 7,158,395 B2 | 1/2007 | Deng et al. |
| 7,183,667 B2 | 2/2007 | Colby et al. |
| 7,193,872 B2 | 3/2007 | Siri |
| 7,256,566 B2 | 8/2007 | Bhavaraju et al. |
| 7,319,313 B2 | 1/2008 | Dickerson et al. |
| 7,324,361 B2 | 1/2008 | Siri |
| 7,333,349 B2 | 2/2008 | Chang et al. |
| 7,333,352 B2 | 2/2008 | Petter et al. |
| 7,338,311 B2 | 3/2008 | Laschinksi et al. |
| 7,339,287 B2 | 3/2008 | Jepsen et al. |
| 7,397,653 B2 | 7/2008 | Taylor |
| 7,411,802 B2 | 8/2008 | Victor et al. |
| 7,414,870 B2 | 8/2008 | Röttger et al. |
| 7,423,894 B2 | 9/2008 | Ilic |
| 7,432,618 B2 | 10/2008 | Taylor |
| 7,433,215 B2 | 10/2008 | Taylor et al. |
| 7,443,052 B2 | 10/2008 | Wendt et al. |
| 7,463,489 B2 | 12/2008 | Falk et al. |
| 7,463,500 B2 | 12/2008 | West |
| 7,471,073 B2 | 12/2008 | Bettenwort et al. |
| 7,479,774 B2 | 1/2009 | Wai et al. |
| 7,508,173 B2 * | 3/2009 | Zhou et al. .................... 323/207 |
| 7,612,466 B2 * | 11/2009 | Skutt .............................. 307/29 |
| 7,855,906 B2 * | 12/2010 | Klodowski et al. ............ 363/97 |
| 2006/0097578 A1 | 5/2006 | Baldwin et al. |
| 2006/0103341 A1 | 5/2006 | Steigerwald et al. |
| 2007/0236187 A1 | 10/2007 | Wai et al. |
| 2007/0252716 A1 | 11/2007 | Burger |
| 2007/0273338 A1 | 11/2007 | West |
| 2008/0094867 A1 | 4/2008 | Muller et al. |
| 2008/0101101 A1 | 5/2008 | Iwata et al. |
| 2008/0122293 A1 | 5/2008 | Ohm |
| 2008/0150366 A1 | 6/2008 | Adest et al. |
| 2008/0180979 A1 | 7/2008 | Taylor et al. |
| 2008/0192510 A1 | 8/2008 | Falk |
| 2008/0197825 A1 | 8/2008 | Siri |
| 2008/0232145 A1 | 9/2008 | Hiller et al. |
| 2008/0257397 A1 | 10/2008 | Glaser et al. |
| 2008/0290252 A1 | 11/2008 | Leonhardt et al. |
| 2008/0291706 A1 | 11/2008 | Seymour et al. |
| 2009/0003024 A1 | 1/2009 | Knaup |
| 2009/0046491 A1 | 2/2009 | Zacharias et al. |
| 2009/0046492 A1 | 2/2009 | Zacharias et al. |
| 2009/0218817 A1 | 9/2009 | Cardinal et al. |

FOREIGN PATENT DOCUMENTS

| | | |
|---|---|---|
| EP | 1463188 A2 | 9/2004 |
| EP | 1861914 B1 | 12/2008 |
| EP | 1178596 B1 | 2/2009 |
| WO | WO 2008/015298 A1 | 2/2008 |
| WO | WO 2008/096019 A1 | 8/2008 |

* cited by examiner

SYSTEM AND METHOD FOR DECREASING SOLAR COLLECTOR SYSTEM LOSSES

FIELD OF THE INVENTION

The present invention relates generally to the field of solar power generation and, more particularly, to a system and method for distributing reactive load among inverters and control of solar collector system voltage to reduce collector system losses.

BACKGROUND OF THE INVENTION

Solar power generation is becoming a progressively larger source of energy throughout the world. Solar farm collector systems utilize a plurality photovoltaic arrays (PV arrays) to convert solar energy incident on the PV arrays into DC power. The solar farm couples the DC output of the PV arrays to one or more DC to AC inverters in order to convert the DC output of the PV arrays into a suitable AC waveform that can be fed to the electrical grid.

In a typical solar farm collector system, a plurality of inverters providing suitable AC electrical outputs from one or more PV arrays are connected in parallel to at least one conductor or network of conductors. The collector system generally includes a plurality of transformers, with one or more of the transformers connected between each inverter and the at least one conductor. A substation transformer can be used to connect the solar farm collector system to the electrical grid.

Existing solar farm control techniques generally relate to voltage control and real and reactive power control, either at the individual inverters or at the point of common coupling for the system. Efficiency of the system, based on loss reduction, has generally not been considered in such control schemes.

Currents flowing in a solar farm collector system create losses due to the electrical resistance of the system. In addition, the collector system transformers have excitation losses that are independent of loading, but which increase with voltage to an exponential power typically greater than two, and often times close to three.

The load loss $P_{LL}(S,V)$, also known as the conduction loss or "copper" loss for a given solar farm complex power output $S$ and voltage $V$, is related to the load loss $P_{LL\text{-}rated}$ at the rated power output $S_{rated}$ and rated (nominal) voltage $V_{rated}$ as follows:

$$P_{LL}(S, V) = \left(\frac{V_{rated}}{V}\right)^2 \left(\frac{S}{S_{rated}}\right)^2 P_{LL\text{-}rated} \quad \text{Equation (1)}$$

The no-load losses of the solar collector system transformers $P_{NL}(V)$, also called the excitation loss or "iron" loss, at any voltage $V$, is related to the no-load loss $P_{NL\text{-}rated}$ at rated $V_{rated}$ as follows:

$$P_{NL}(V) = \left(\frac{V}{V_{rated}}\right)^N P_{NL\text{-}rated} \quad \text{Equation (2)}$$

where $N$ is an empirically derived exponent unique to the magnetic design and materials of the transformers used in the collector system.

The total loss $P_{LOSS}(S,V)$ at any voltage and complex power level is the sum of Equation (1) and Equation (2), as described below as follows:

$$P_{LOSS}(S, V) = \left(\frac{V_{rated}}{V}\right)\left(\frac{S}{S_{rated}}\right)^2 P_{LL\text{-}rated} + \left(\frac{V}{V_{rated}}\right)^N P_{NL\text{-}rated} \quad \text{Equation (3)}$$

The total loss, i.e. the sum of the "copper" losses and "iron" losses, can be reduced by controlling V. This can be accomplished, for instance, by differentiating Equation (3) with respect to V, and solving for the value of V where the first derivative is zero.

For typical parameters, FIG. 1 depicts the variation of total loss with voltage level for four different power levels. At 10% power, a low voltage provides reduced losses. At 30% power, a voltage near rated voltage provides reduced losses, and above this power level (e.g. at 50% and 100%), a high voltage provides reduced losses. The same information is shown in a 3-dimensional format in FIG. 2.

Certain loss reduction techniques are known, for instance, for use with wind farm collector systems. In solar farm systems, however, loss reduction concerns must also take into account the fact that the inverters are typically coupled relatively close together and that the solar farm system will have no power output during the night when solar energy is not available.

It would be possible to design a lower loss collector system by decreasing the collector system resistance, for instance by increasing conductor cross sectional area or by designing a higher voltage collector system. These alternatives, however, can require substantial equipment investment and costs such that the savings in reduced losses generally do not justify the equipment investment.

Thus, there is a need to provide a method and system for reduction of total losses of the solar farm collector system through distribution of reactive loads and voltage control, while maintaining essentially the same physical equipment and control structure for the system.

BRIEF DESCRIPTION OF THE INVENTION

Aspects and advantages of the invention will be set forth in part in the following description, or may be obvious from the description, or may be learned through practice of the invention.

One embodiment of the present disclosure is directed to a solar farm system that includes a plurality of inverters. Each of the inverters supply AC power from at least one photovoltaic array. The system includes a collector system having at least one conductor. The plurality of inverters are coupled to the at least one conductor such that the collector system includes a point of common coupling for the inverters. A substation transformer can be used to couple the collector system to an electrical grid. The system includes a control system configured to determine an operating parameter, such as a reactive power distribution or a collector system voltage, for the solar farm system to reduce electrical loss. The control system is configured to regulate at least one of the collector system and the plurality of inverters based at least in part on the at least one operating parameter.

Another exemplary embodiment of the present disclosure is directed to a method for controlling a solar farm system. The method includes coupling a plurality of inverters to a collector system. The collector system has at least one conductor. The plurality of inverters are coupled to the at least one conductor such that that the collector system includes a point of common coupling for the inverters. The collector system can be coupled to an electrical grid through a substation transformer. The method also includes determining at least one operating parameter, such as a reactive power distribution or a collector system voltage, for the solar farm system to reduce electrical loss. At least one of the collector system and the plurality of inverters can be regulated by a control system based on the operating parameter.

Variations and modifications can be made to these exemplary embodiments of the present disclosure.

These and other features, aspects and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Figure 1:
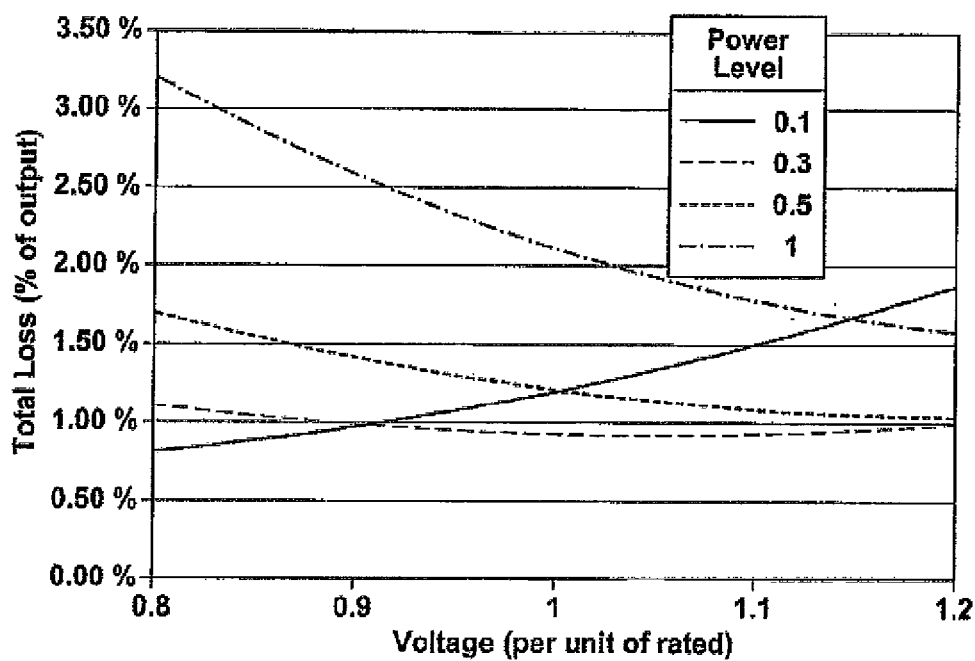
FIG. 1 depicts a graph illustrating the variation of total power loss with voltage level for varying power levels.
Figure 2:
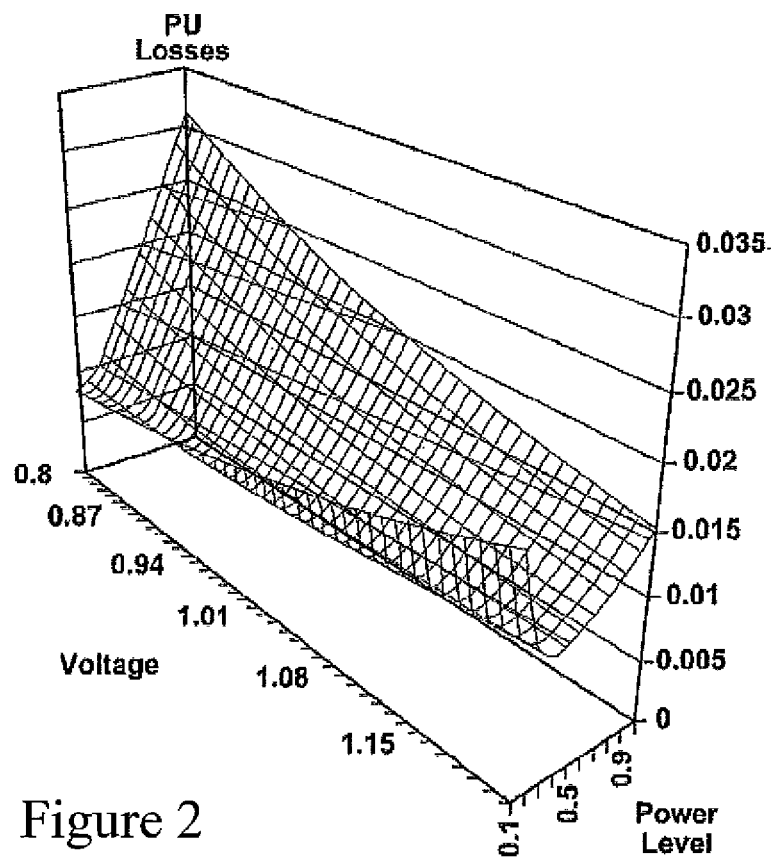
FIG. 2 is a 3-dimensional graph illustrating the variation of total power loss with voltage level for varying power levels.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Generally, the present disclosure is directed to systems and methods for reducing electrical losses in a solar farm collector system. A solar farm collector system typically includes a long conductor with a plurality of inverters connected in parallel along its length. The inverters are used for converting the DC power generated by PV arrays into AC power. The conductor can be a simple radial configuration, in a dendritic topology with one or more branchings, or in a loop configuration.

According to embodiments of the present disclosure, the electrical losses of the system can be reduced by controlling reactive power production assignments to the individual inverters and by controlling collector system voltage. Reducing these losses yields greater energy production supplied to the electrical grid, and thus increased revenue for the solar farm owner.

In a first approach according to one exemplary embodiment of the present disclosure, the solar farm collector system voltage level is managed such that the total loss is reduced. For the purpose of this disclosure, variations in voltage magnitude within the solar farm collector system are not considered. The control of the inverter reactive power output is also not considered in connection with this exemplary embodiment of the present disclosure.

The first approach can be implemented through use of an on-load tap changer on the solar farm substation transformer, allowing adjustment of the collector system voltage independent of the grid voltage. A principle constraint is that the voltage at each inverter must be within operating limits for the inverter, e.g. within about 0.9 to about 1.1 times rated voltage. A functionality requirement for such control is that the substation transformer preferably has sufficient tap range to provide a ratio matching the controlled collector system voltage with the utility grid voltage.

The first approach can be applied with solar farm substation transformer having on-load tap changing ability allowing the collector voltage to be adjusted independent of the grid voltage. In the first approach, collector voltage is controlled to balance the tradeoff between copper and iron losses. Under light load, the voltage is reduced to decrease iron loss. Under heavy load, the voltage is increased to reduce current for the same power, this reducing copper losses.

The first approach according to one exemplary embodiment of the present disclosure can also be used where on-load tap changing capability is not available, by adjusting collector system voltage using inverter reactive capability where solar farm power factor or voltage regulation is not required. In certain embodiments, the solar farm collection system can include a control system that is configured to use an algorithm to reduce electrical losses for the solar farm by controlling the collector system voltage.

In a second approach according to another exemplary embodiment of the present disclosure, the power losses in a solar farm collector system are reduced by managing the distribution of reactive power production among the individual inverters. For instance, in one embodiment, the total solar farm reactive power production is dispatched with priority to the inverters that are closest to the point of common coupling. Other controllable reactive power generating components connected to the collector system can also be used to control the distribution of reactive power. These devices can include insertable capacitor banks, static VAR compensators, and reactor banks strategically positioned within various sections or branches of the solar farm to influence the distribution of reactive currents and control power losses.

According to one exemplary embodiment of the present disclosure, a control system for the solar farm collector system uses an algorithm whose technical effect is to determine the reactive power dispatching command to each inverter and substation transformer tap that reduces total losses within each feeder in the solar farm collector system, thus increasing solar farm output. Losses are estimated to be reduced by 2-3% when the solar farm is operating around 50% VAR production/consumption.

The algorithm can be implemented using a control system including one or more computing devices. The computing devices are not limited to any particular hardware architecture or configuration. For instance, embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well. The algorithm can be compatible with and extended to solar farm voltage and power factor regulation. Generally, the algorithm can be utilized with any solar farm collector system design.

Mathematically, an optimization problem is generally described by minimizing an objective function J(u,x) subject to some constraint conditions. In matrix notation, this operation can be expressed as: Minimize J(u,x), subject to the constraints: d(u,x)=0 and e(u,x)≦0, where x represents system variable (e.g., bus voltages, power factor); u represents control variables (e.g., inverter reactive power); J(u,x) represents an objective function; d(u,x) represents equality constraints; and e(u,x) represents inequality constraints.

An exemplary objective function that can be used in accordance with embodiments of the present disclosure is provided in Equation (3) as follows:

$$P_{LOSS}(S, V) = \left(\frac{V_{rated}}{V}\right)\left(\frac{S}{S_{rated}}\right)^2 P_{LL\text{-}rated} + \left(\frac{V}{V_{rated}}\right)^N P_{NL\text{-}rated} \quad \text{Equation (3)}$$

This function can be employed in embodiments of the present disclosure to reduce distribution line losses ($P_{loss}$) subject to maintaining power factor at the solar farm point of common coupling (POCC). It can also be desirable to establish a hierarchy of performance enforcing a tighter voltage tolerance band at a subset of nodes. Applied to losses in a solar farm system, the function is specified below:

$$J = \sum_{k=1}^{n} PLoss_k \quad \text{Equation (4)}$$

where $$P_{LOSS}(S, V) = \left(\frac{V_{rated}}{V}\right)\left(\frac{S}{S_{rated}}\right)^2 P_{LL\text{-}rated} + \left(\frac{V}{V_{rated}}\right)^N P_{NL\text{-}rated}$$

and subject to a system constraint that the system PF by at a specified value, such as about 0.95 (over excited).

Figure 4:
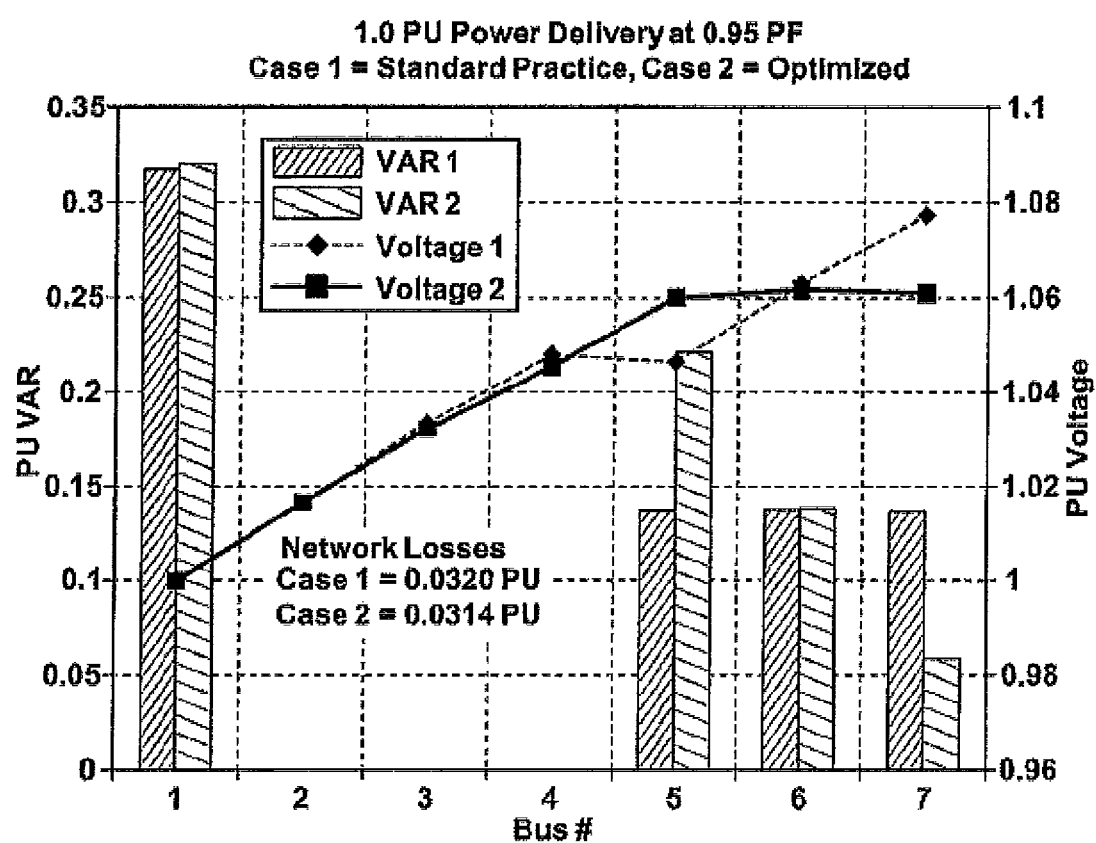
FIG. 4 depicts a graphical comparison of voltage and reactive power distribution in a simple solar farm system with a standard reactive power distribution versus a reactive power distribution among the inverters according to an exemplary embodiment of the present disclosure.

A comparison according to one exemplary embodiment of the present disclosure for distribution of reactive load Q, so as to reduce losses, is shown in FIG. 4 for the simple solar farm system of FIG. 4. The example is illustrated using per unit values.

Figure 3:
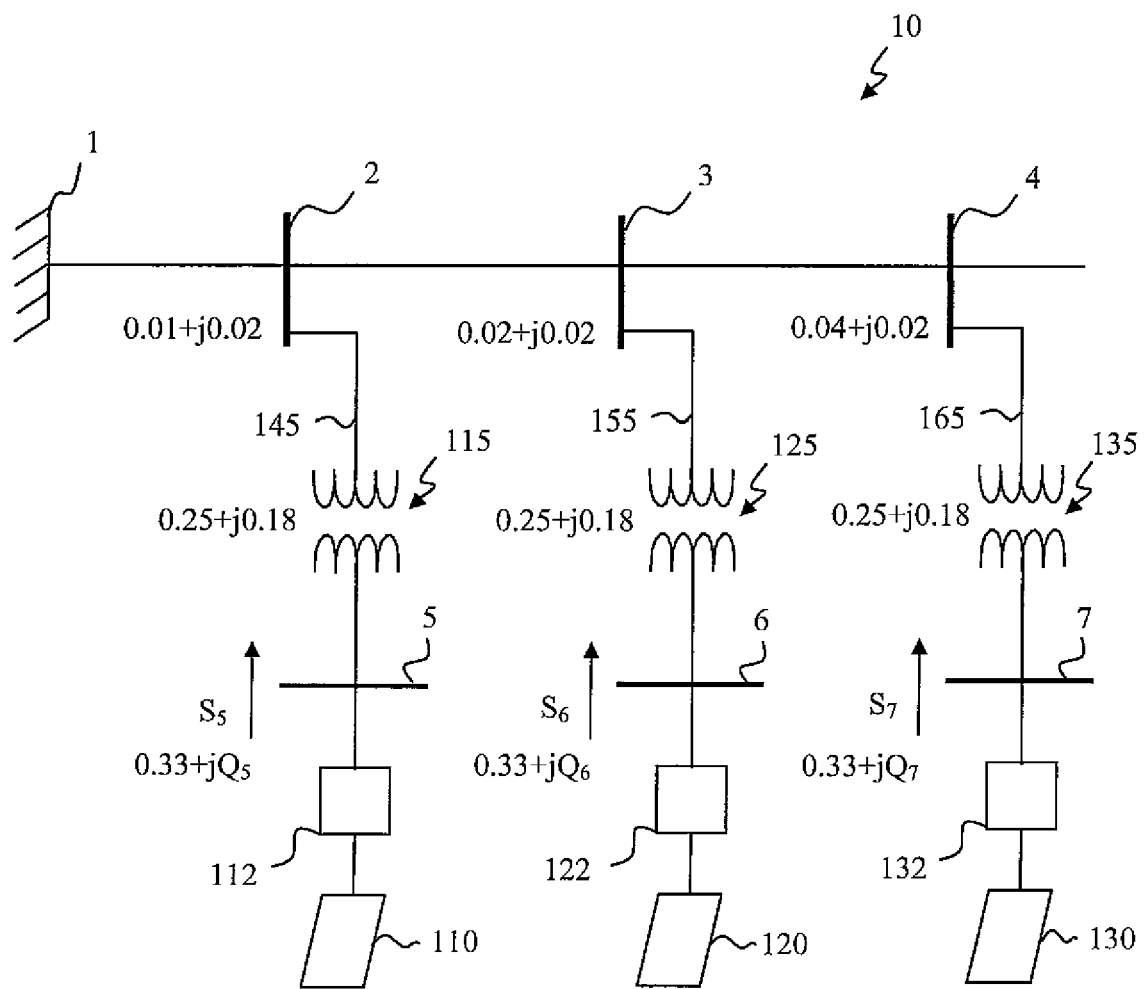
FIG. 3 depicts an exemplary solar farm system for the purpose of illustrating a reactive load distribution according to an exemplary embodiment of the present disclosure.

FIG. 3 illustrates a simplified solar farm collector system of three PV arrays and their respective inverters for the purpose of illustrating a reactive load distribution according to one exemplary embodiment the present disclosure. The simplified solar farm system 10 includes three PV arrays 110, 120 and 130 coupled to respective inverters 112, 122, and 132. The inverters 112, 122, and 132 deliver loads $S_5$=0.33+$jQ_5$, $S_6$=0.33+$jQ_6$, $S_7$=0.33+$jQ_7$ of a total complex power demand of 1.0 PU at 0.95 power factor (PF) at the POCC 1. Each inverter feeds the main bus through identical transformers 115, 125 and 135 with impedances of 0.25+j0.18, resulting in transformer losses. Transformed outputs 145, 155, 165, from the inverters 111, 122 and 132 respectively, are connected to common system lines at buses 2, 3 and 4 and to a POCC connection bus 1 with the grid.

The exemplary solar farm collector system 10 incurs no-load or "iron" losses on transformers 115, 125 and 135 and line losses or "copper" losses between bus 1 to 2, 2 to 3, and 3 to 4 dependent on the assignment of the total Q to $Q_5$, $Q_6$ and $Q_7$ among the inverters 112, 122, and 132.

When Equation 4 is applied to the network 10 of FIG. 3, subject to the constraint that of power delivery at 0.95 PF at the POCC 1, the results of FIG. 4 are generated. FIG. 4 illustrates a comparison of VAR distribution and voltage distribution of the system of FIG. 3 with a standard VAR distribution and an VAR distribution according to an exemplary embodiment of the present disclosure among the solar farm generators. The left hand vertical axis is PU VAR values and the right hand vertical axis is PU voltage, provided for buses 1 through 5 as designated on the horizontal axis. Case 1 represents the standard prior art method of drawing reactive power equally among the solar farm inverters at buses 5, 6 and 7. Case 2 represents values of reactive power at buses 5, 6 and 7 according to an exemplary embodiment of the present disclosure for reduction of losses. Based on the above determination, the inventive system commands PV arrays 110, 120 and 130 to produce approximately 0.28 PU VAR, 0.13 PU VAR and 0.06 PU VAR. Loss reduced outputs of the individual inverters at other PU of power delivery and power factor are similarly determined.

In practice, a solar farm consists of numerous (sometimes more than 100) individual inverters. While the complexity for such systems are greater than the simple example of FIG. 3, the loss reduction process for such application can be similarly performed.

Figure 5:
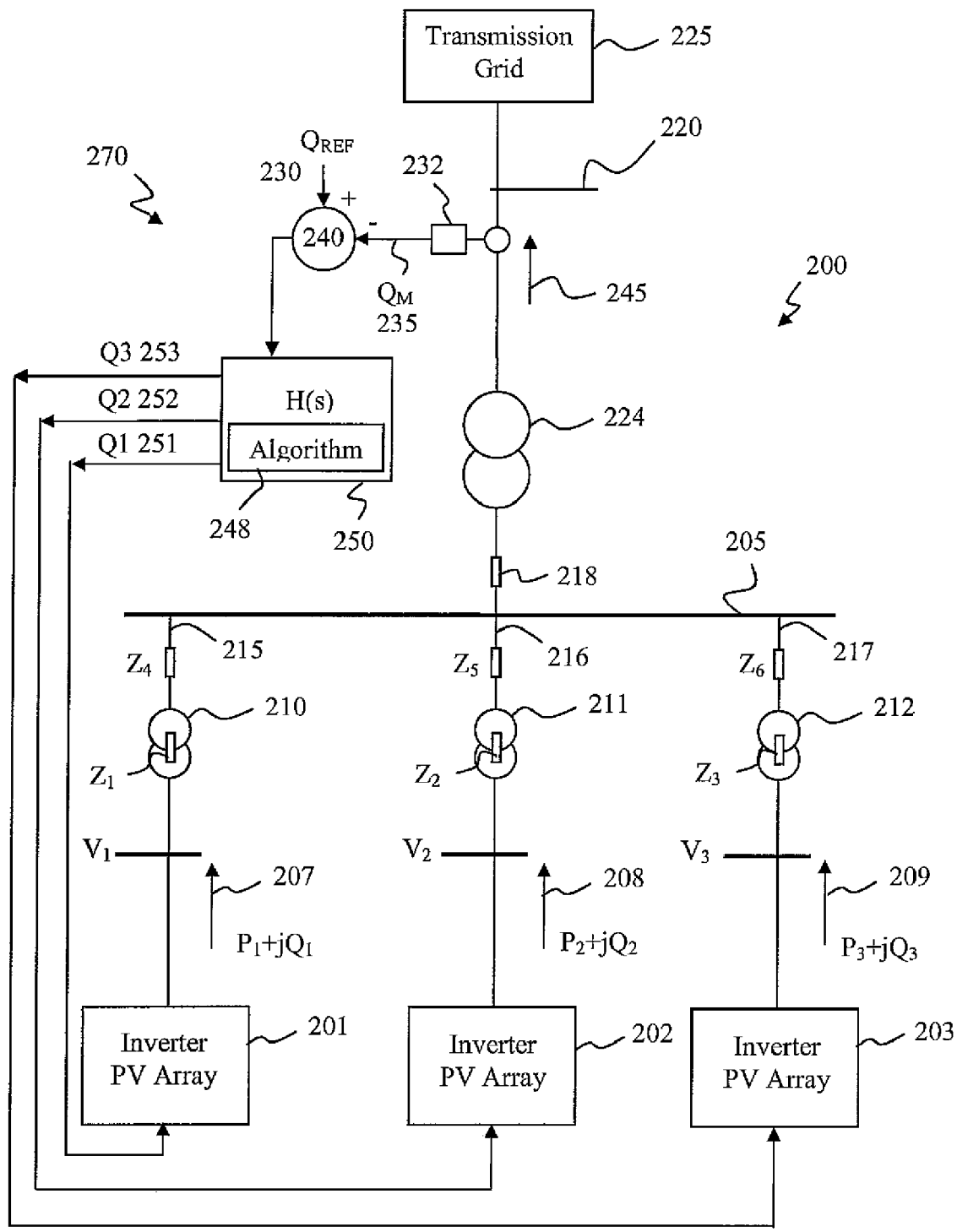
FIG. 5 depicts an exemplary solar farm collector system employing a loss reduction technique according to an exemplary embodiment of the present disclosure.

FIG. 5 illustrates an exemplary solar farm collector system employing loss reduction techniques according to an exemplary embodiment of the present disclosure. The solar farm system 200 includes solar farm PV array/inverter arrangements 201, 202, and 203. Using the disclosures provided herein, however, one of ordinary skill in the art should understand that the number of PV array/inverters can be broadly extended in practical application. The inverters 201, 202 and 203 provide respective outputs 207, 208, and 209 of $P_1+jQ_1$ (207), $P_2+jQ_2$ (208) and $P_3+jQ_3$ (209). Each inverter 201, 202 and 203 is tied to a collector bus 205 through a inverter collector transformer 210, 211 and 212, respectively. The transformer presents an impedance $Z_1$, $Z_2$, and $Z3$ to the collector system. The inverter transformers 210, 211 and 212 may be located at varying physical distances 215, 216 and 217 from the collection bus 205 presenting different line resistance and reactance ($Z_4$, $Z_5$ and $Z_6$) to the system. A common path for one or more inverter loads can also be presented to the collector system such as 218 ($Z_7$) between the collection bus 205 and solar farm main transformer 224. While the impedances are shown for illustrative purposes as discrete elements, it is recognized that they may represent distributed line elements, representing varying distances of line.

Further in such a system, although not illustrated in FIG. 5, multiple inverters can be combined at different lengths along different legs and then connected to the collector bus 205. Other configurations may include a dendritic topology with one or more branchings or looped networks. While such arrangements are more complex, circuit modeling for such systems can be performed.

Again referring to FIG. 5, the collector bus 205 is tied through a point of common coupling to a transmission grid 225 through solar farm main transformer 224. Sensing devices 232 at the POCC 220 may provide measured voltage, current, power factor, real power and reactive power signals to a solar farm control system. While not shown, sensing devices can be alternatively located at other locations other than the POCC 220 to provide voltage and other measurements. In a further embodiment, signals at the point of common coupling can be calculated based on solar farm system measurements and a knowledge of the network impedance.

A control system 270 is provided for the solar farm. A reference command is provided to the solar farm control system 270 for control of real and reactive power. However, only the reactive load reference command signal $Q_{REF}$ 230 and reactive measured load signal $Q_M$ (measured) 235 are provided to summer 240. The output from summer 240 is provided to control function H(s) 250 for determining reactive load distribution to the individual inverters. Control function H(s) 250 incorporates a loss reduction algorithm 248 whose technical effect is to reduce solar farm system loss by assignment of reactive loads $Q_1$ 251, $Q_2$ 252 and $Q_3$ 253 based on losses resulting from $Z_1$, $Z_2$ and $Z_a$ solar farm generator connection transformer losses, from $Z_4$, $Z_5$ and $Z_6$ line losses, and $Z_7$ line losses. Further, the solar farm control algorithm can be subject to various constraints, one of which may be a power factor of approximately 0.95 at the POCC.

In a solar farm where on-load tap changing capability exists on the main transformer to the grid, voltage control may similarly be exercised to reduce losses. In this case, the standard method for an equal distribution of VARs to all inverters can be employed, but the voltage at the solar farm collector can be controlled to reduce losses. This approach can be employed provided the on-load tap changing capability permits the desired collector voltage to be matched to the required grid voltage of the POCC.

The loss reduction algorithm incorporated by embodiments of the present disclosure can be determined based on reactive load commands $Q_1$ 251, $Q_2$ 252 and $Q_3$ 253 being equally ordered to each inverter (201, 202, 203). Alternatively, the loss-reduction algorithm may combine the VAR distribution technique and the voltage control technique.

Figure 6:
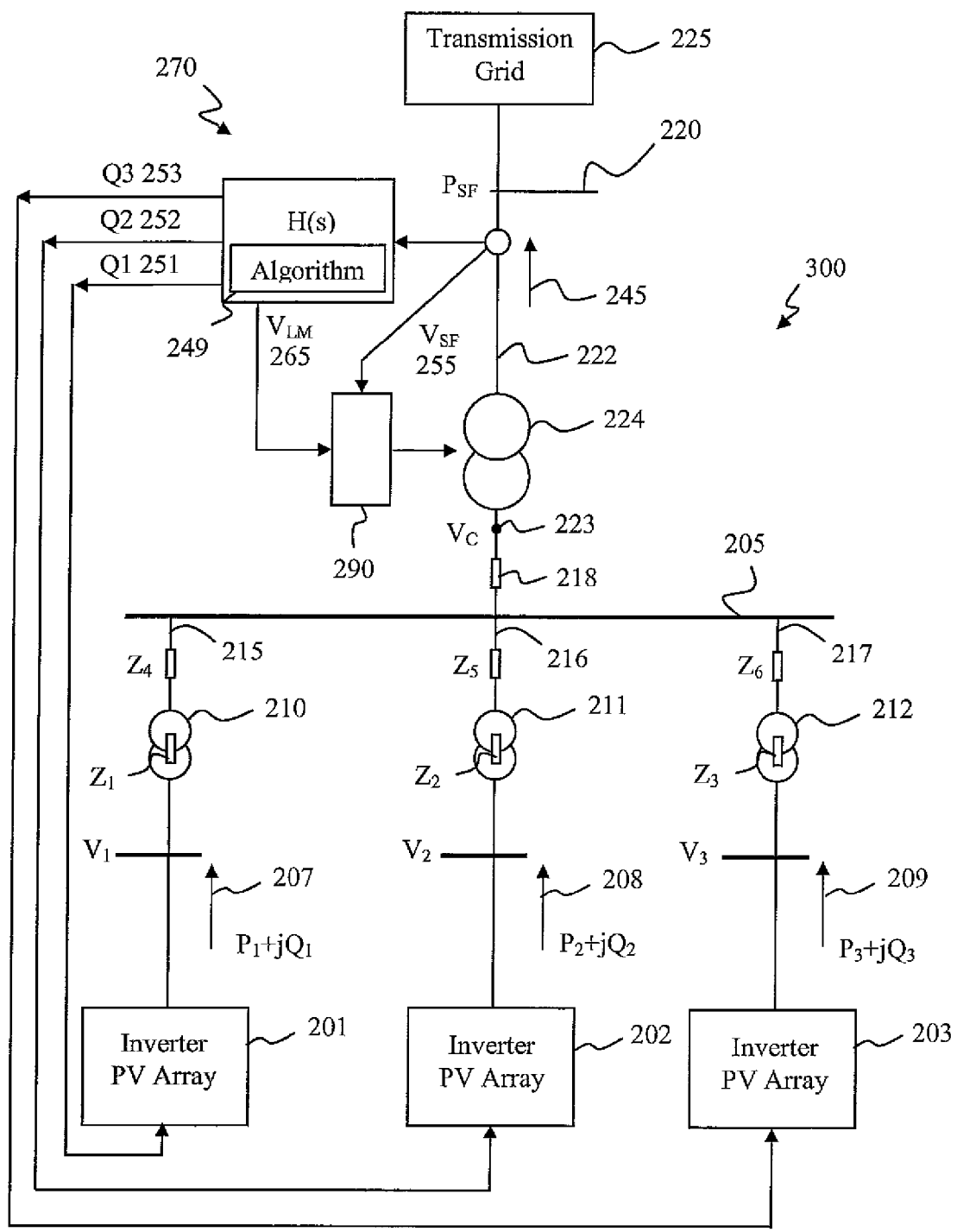
FIG. 6 depicts an exemplary solar farm collector system with on-load tap changing control employing loss reduction techniques according to an exemplary embodiment of the present disclosure.

FIG. 6 illustrates an exemplary solar farm collector system with on-load tap changing control employing a control system incorporating a loss reduction algorithm according to an exemplary embodiment of the present disclosure. The solar farm collector system with on-load tap changing capability 290 is configured in a similar manner to that of FIG. 5. Reference numbers from FIG. 5 have been retained where the components and functions are unchanged. Three PV array/inverter assemblies 201, 202 and 203 provide respective outputs 207, 208, and 209 of $P_1+jQ_1$(207), $P_2+jQ_2$ (208) and $P_3+jQ_3$ (209) to a system whose losses can be modeled as including: no-load transformer losses in inverter connection transformers 210, 211 and 212; transformer load losses from $Z_1$, $Z_2$, and $Z_3$; line losses from $Z_4$, $Z_5$ and $Z_6$ and common line losses from $Z_7$. While the impedances are shown for illustration purposes as discrete elements, one of ordinary skill in the art, using the disclosures provided herein, should recognize that the impedances may represent distributed line elements, representing varying distances of the line.

FIG. 6 further illustrates a solar control system 270 including a control function H(s) 250 that determines a system voltage setting based on reducing system losses. According to a loss reduction algorithm 249, a voltage $V_C$ 223 on the collector bus side of the solar farm main transformer 224 is determined that reduces system losses described above, subject to the constraints of solar farm output 245 of real and reactive power ($P_{SF}$ and $Q_{SF}$, respectively) at the POCC 220. The loss reduction voltage 223 corresponds to a measured voltage $V_{SF}$ 255 at the main transformer output 222 reflected through the main transformer 224 characteristics. Control function H(s) 250 provides the loss reduction voltage signal $V_{LM}$ 265. $V_{LM}$ 265 and $V_{SF}$ feedback signal 255 are provided to the on-load tap changer control 290. On-load tap changer control 290 adjusts voltage tap settings on the solar farm main transformer to establish the loss reduction voltage at the input 223 to the solar farm main transformer 224. The loss reduction algorithm 249 can be subject to the constraint that the voltage ($V_1$, $V_2$, $V_3$) at the output of each inverter must be within the operating limits for that device; e.g., 0.9 to 1.1 times rated voltage.

Figure 7:
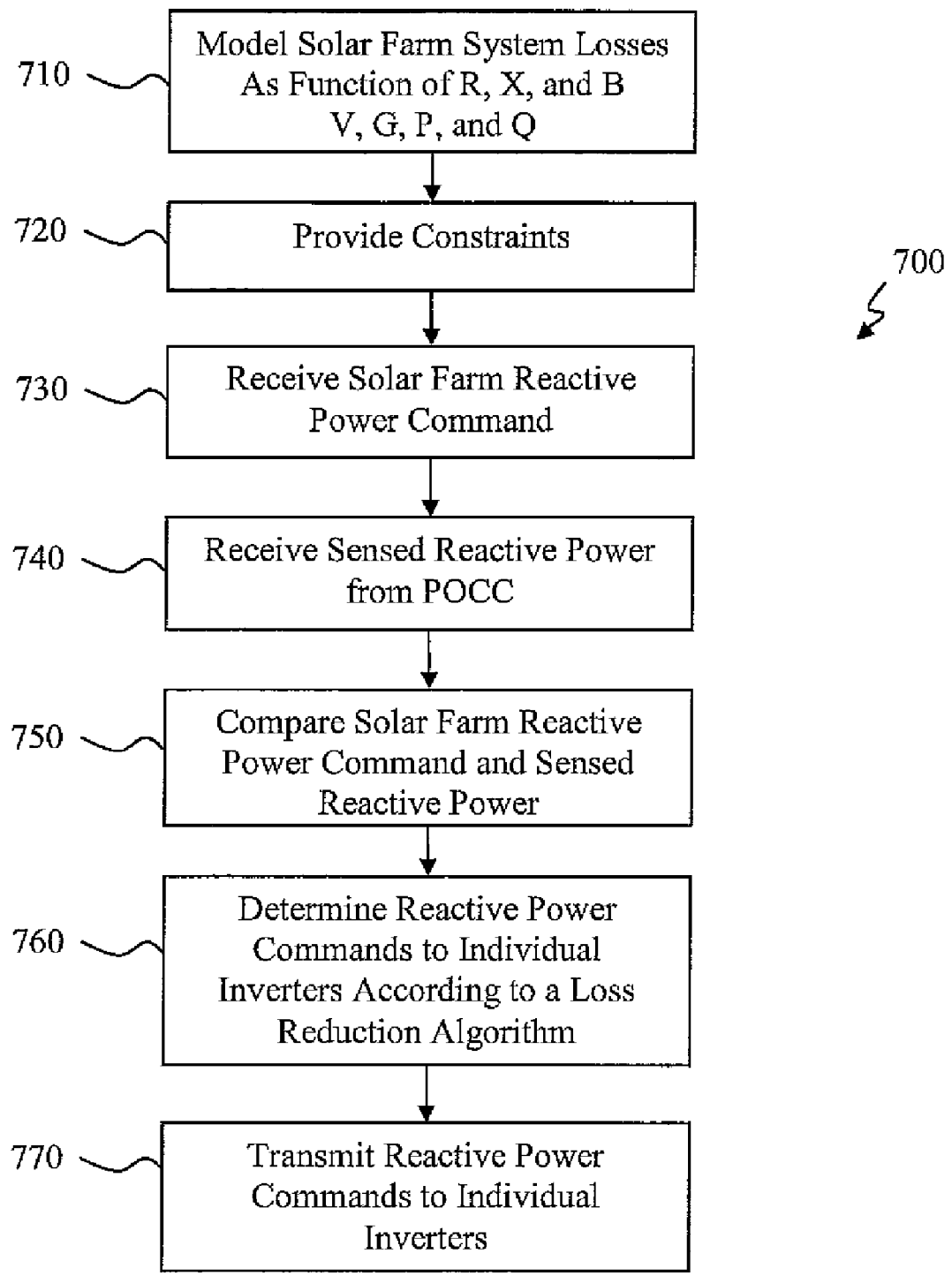
FIG. 7 depicts a flow chart of the exemplary steps associated with a method for reducing system loss through assignment of reactive load to individual inverters according to an exemplary embodiment of the present disclosure.

FIG. 7 depicts a flow diagram of an exemplary method for reducing system loss through assignment of reactive load to individual inverters according to an exemplary embodiment of the present disclosure. Initially, at 710, the solar farm collector system losses are modeled as a function of resistance R, reactance X, nonlinear conductance G, susceptance B, voltage, and real and reactive load. At 720, system constraints are provided, including factors such as power flow, power factor and voltage requirements. At 730 a solar farm reactive power or voltage command is received by the controls. At 740, the sensed reactive power at the POCC is received by the system controls. The solar farm reactive power command and the sensed reactive power are compared at 750. At 760 the reactor power commands are assigned to the individual inverters according to a loss reduction algorithm. At 770, the individual reactive power commands are transmitted to the individual inverters.

Figure 8:
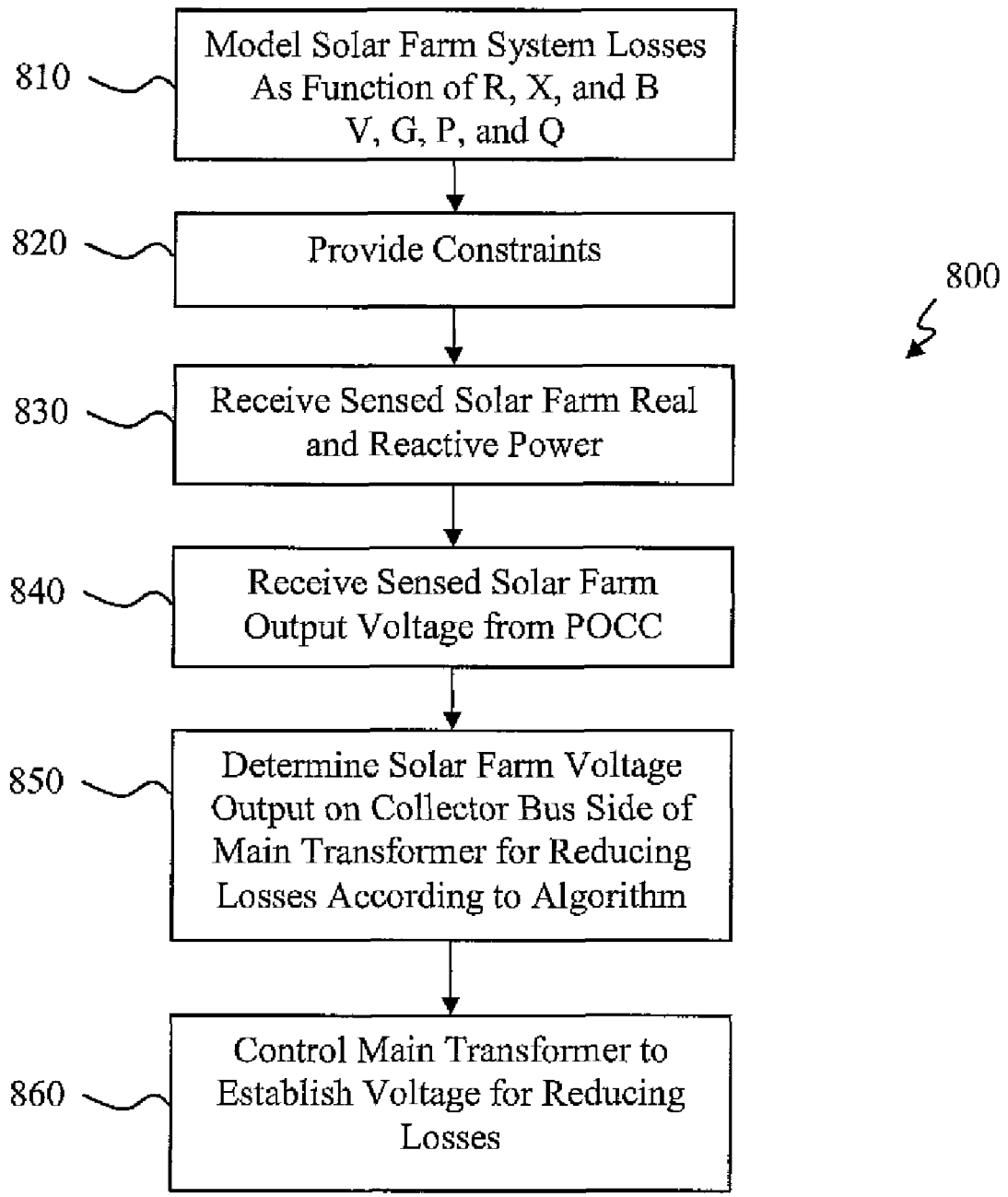
FIG. 8 depicts a flow chart of the exemplary steps associated with a method for controlling a voltage on the collector system side of the solar farm main transformer according to another exemplary embodiment of the present disclosure.

FIG. 8 depicts a flow chart of the an exemplary method for establishing a voltage on the collector system side of the solar farm main transformer according to another exemplary embodiment of the present disclosure. Initially, at 810, the solar farm collector system losses are modeled as a function of resistance R, reactance X, nonlinear conductance G, susceptance B, voltage, and real and reactive load. At 820, system constraints are provided, including factors such as voltage range at the output of the inverters. At 830, a solar farm real and reactive power output at the POCC is received by the system controller. At 840, the sensed voltage output at the POCC is received by the system controller. At 850, the voltage on the collector bus side of the main transformer is determined according to a loss reduction algorithm, subject to system constraints. At 860, the on-load tap changer on the main transformer is controlled to establish the voltage for loss reduction.

Previous solar farms have been equipped with controllers that regulate POCC voltage and power factor quantities, but none built to date have incorporated methods to regulate these system quantities and reduce the losses simultaneously.

One exemplary aspect of the present disclosure utilizes a control system that incorporates an algorithm which determines a collector system voltage for reducing loss and then controls the tap changer to establish the collector system voltage. A second exemplary aspect of the present disclosure includes a control system that incorporates an algorithm, which considers the collector system impedance and selectively operates each inverter at a different VAR output while still maintaining the required output as measured at the POCC. Both exemplary approaches can provide for reduction in system losses without the need for additional system hardware.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A solar farm system, comprising:
   a plurality of inverters, each said inverter supplying AC power from at least one photovoltaic array;
   a collector system comprising at least one conductor, said plurality of inverters being coupled to the at least one conductor;
   a substation transformer connecting said collector system through a point of common coupling to an electrical grid; and,
   a control system configured to determine at least one operating parameter for said solar farm system to reduce electrical loss, said control system configured to regulate at least one of said collector system and said plurality of inverters based at least in part on the at least one operating parameter;
   wherein the at least one operating parameter comprises a collector system voltage at the collector system side of said substation transformer.

2. The solar farm system of claim 1, wherein the electrical loss comprises conduction loss and no-load excitation loss.

3. The solar farm system of claim 1, wherein the at least one operating parameter further comprises a reactive power distribution for said plurality of inverters, said control system configured to regulate the reactive power output of at least one of said inverters based on the determined reactive power distribution.

4. The solar farm system of claim 3, wherein the reactive power distribution is determined based at least in part by shifting reactive power to inverters closest to the point of common coupling.

5. The solar farm system of claim 3, wherein said control system is configured to determine the reactive power distribution based at least in part on system constraints, the system constraints comprising maintaining at least one of a power factor, power flow, and voltage at the point of common coupling.

6. The solar farm system of claim 1, wherein the control system is configured to determine the collector system voltage as a function of complex power output by the solar farm system.

7. The solar farm collector system of claim 1, wherein said substation transformer has on-load tap changing capability, said control system being further configured to regulate said substation transformer to execute the determined collector system voltage.

8. The solar farm collector system of claim 1, wherein said control system is configured to determine the collector system voltage based at least in part on system constraints, the system constraints comprising maintaining at least one of a power factor, power flow, and voltage at the point of common coupling.

9. The solar farm collector system of claim 1, wherein said control system is configured to implement an algorithm whose technical effect is reducing electrical losses for the solar farm system.

10. The solar farm collector system of claim 9, wherein the algorithm comprises:
    determining a reactive power distribution for said inverters based at least in part by shifting reactive power to said inverters closest to the point of common coupling; and,
    determining a collector system voltage as a function of complex power output by the solar farm system.

11. A method for controlling a solar farm system, comprising:
    coupling a plurality of inverters to a collector system, the collector system comprising at least one conductor;
    coupling the collector system through a point of common coupling to an electrical grid through a substation transformer;
    determining at least one operating parameter for the solar farm system to reduce electrical loss; and,
    regulating at least one of the collector system and the plurality of inverters based on the operating parameter;
    wherein the at least one operating parameter comprises a collector system voltage at the collector system side of said substation transformer.

12. The method of claim 11, wherein the electrical loss comprises conduction loss and no-load excitation loss.

13. The method of claim 11, wherein determining at least one operating parameter further comprises determining a reactive power distribution for the plurality of inverters, said method comprising regulating the reactive power output of at least one of the inverters based on the determined reactive power distribution.

14. The method of claim 13, wherein determining a reactive power distribution comprises shifting reactive power to inverters closest to the point of common coupling.

15. The method of claim 13, wherein determining a reactive power distribution comprises maintaining at least one of a power factor, power flow, and voltage at the point of common coupling.

16. The method of claim 11, wherein the collector system voltage is determined as a function of complex power output by the solar farm system.

17. The method of claim 11, wherein determining the collector system voltage comprises maintaining at least one of a power factor, power flow, and voltage at the point of common coupling.

18. The method of claim 11, wherein determining at least one operating parameter comprises implementing an algorithm having a technical effect of reducing electrical losses in the solar farm system, the algorithm comprising:

determining a reactive power distribution for the inverters based at least in part by shifting reactive power to inverters closest to the point of common coupling; and, determining a collector system voltage as a function of complex power output by the solar farm system.

19. A solar farm system, comprising:

a plurality of inverters, each said inverter supplying AC power from at least one photovoltaic array;

a collector system comprising at least one conductor, said plurality of inverters being coupled to the at least one conductor;

a substation transformer connecting said collector system through a point of common coupling to an electrical grid; and, a control system configured to determine at least one operating parameter for said solar farm system to reduce electrical loss, said control system configured to regulate at least one of said collector system and said plurality of inverters based at least in part on the at least one operating parameter;

wherein the at least one operating parameter comprises at least one of a reactive power distribution for said plurality of inverters, the reactive power distribution the reactive power distribution being determined based at least in part by shifting reactive power to inverters closest to the point of common coupling.

20. The system of claim 19, wherein said control system is configured to implement an algorithm whose technical effect is minimizing electrical losses for the solar farm system.

* * * * *